US008919284B2

(12) United States Patent
Wolfe, Jr. et al.

(10) Patent No.: US 8,919,284 B2
(45) Date of Patent: Dec. 30, 2014

(54) ANIMAL BED

(75) Inventors: Jerry J. Wolfe, Jr., Hutto, TX (US); Harold Keith Benson, Hutto, TX (US)

(73) Assignee: Starmark Pet Products, Inc., Hutto, TX (US)

( * ) Notice: Subject to any disclaimer, the term of this patent is extended or adjusted under 35 U.S.C. 154(b) by 13 days.

(21) Appl. No.: 13/452,217

(22) Filed: Apr. 20, 2012

(65) Prior Publication Data
US 2013/0276708 A1    Oct. 24, 2013

(51) Int. Cl.
*A01K 1/035*    (2006.01)
*A47C 19/02*    (2006.01)

(52) U.S. Cl.
USPC ............................................. 119/28.5; 5/110

(58) Field of Classification Search
USPC ............................................. 119/28.5; 5/110
See application file for complete search history.

(56) References Cited

U.S. PATENT DOCUMENTS

| | | |
|---|---|---|
| 695,752 A | 3/1902 | Moehle |
| 733,405 A | 7/1903 | Lein |
| 980,167 A | 12/1910 | Palmer |
| 996,640 A | 7/1911 | Haplin |
| 1,024,197 A | 4/1912 | Halpin |
| 1,080,577 A | 12/1913 | Pascals et al. |
| 1,135,707 A | 4/1915 | Mattes |
| 1,270,780 A | 7/1918 | Bugg |
| 1,275,734 A | 8/1918 | Pezzetti |
| 1,412,064 A | 4/1922 | Sanford |
| 1,569,728 A | 1/1926 | Douglas et al. |
| 1,608,290 A | 11/1926 | Basford |
| 1,820,283 A | 8/1931 | Mills |
| 1,820,285 A | 8/1931 | Mills |
| 1,972,309 A | 9/1934 | McMurchy |
| 2,611,906 A | 9/1952 | Backer |
| 2,640,996 A | 6/1953 | Davis |
| 2,646,577 A | 7/1953 | Thayer |
| 2,774,081 A | 12/1956 | Lukala |
| 2,871,489 A | 2/1959 | Emmert |
| 2,900,956 A | 8/1959 | Hoffman |
| 2,964,222 A | 12/1960 | Rainwater |
| 2,980,058 A | 4/1961 | Hoffman |
| 2,992,442 A | 7/1961 | Lehman et al. |
| 3,125,663 A | 3/1964 | Hoffman |
| 3,232,270 A | 2/1966 | Sweeney, Jr. |
| 3,336,060 A | 8/1967 | Bradford |
| 3,426,367 A * | 2/1969 | Bradford ........................ 5/626 |
| 3,768,105 A | 10/1973 | Gregory |
| 3,846,855 A | 11/1974 | Peterson |
| 3,956,781 A | 5/1976 | Reemelin |
| 3,965,502 A | 6/1976 | Bertram |
| 4,076,431 A | 2/1978 | Burvall |
| 4,511,071 A | 4/1985 | Curran |
| 4,594,743 A | 6/1986 | Owen et al. |
| 4,663,787 A | 5/1987 | Kolsch |
| 4,688,281 A | 8/1987 | Lantz |
| 4,860,689 A | 8/1989 | Stewart |
| 4,883,206 A | 11/1989 | Miller |

(Continued)

*Primary Examiner* — Yvonne Abbott

(74) *Attorney, Agent, or Firm* — Brian F. Russell; Russell Ng Law

(57) ABSTRACT

An animal bed includes a plurality of elongate frame members, a plurality of corner fittings coupling the plurality of elongate frame members to form a frame, bedding supported by the frame, and at least one support supporting the frame above an underlying substrate. Each of at least first and second corner fittings among the plurality of corner fittings has a passage formed therethrough that receives therein a corresponding one of the elongate frame members.

24 Claims, 8 Drawing Sheets

(56) References Cited

U.S. PATENT DOCUMENTS

| | | | |
|---|---|---|---|
| 4,921,369 A | 5/1990 | Chew, II et al. | |
| 4,958,390 A | 9/1990 | Mendenhall | |
| 5,003,649 A | 4/1991 | Kelly | |
| 5,072,694 A | 12/1991 | Haynes et al. | |
| 5,150,980 A | 9/1992 | Lin | |
| 5,241,717 A | 9/1993 | Ward et al. | |
| 5,301,377 A | 4/1994 | Kim | |
| 5,555,576 A | 9/1996 | Kim | |
| 5,577,465 A | 11/1996 | Cook | |
| D379,682 S | 6/1997 | Rafaat | |
| 5,699,571 A | 12/1997 | Yowell | |
| 5,860,389 A | 1/1999 | Caldwell | |
| 5,960,739 A * | 10/1999 | Storm | 119/28.5 |
| 5,992,348 A * | 11/1999 | Harding | 119/28.5 |
| 6,035,468 A | 3/2000 | Lee | |
| 6,039,501 A | 3/2000 | Ruther | |
| 6,044,794 A | 4/2000 | Raitanen et al. | |
| D431,695 S | 10/2000 | Burt | |
| 6,134,727 A * | 10/2000 | Hwang | 5/114 |
| 6,173,463 B1 | 1/2001 | Callahan et al. | |
| 6,199,508 B1 | 3/2001 | Miale et al. | |
| 6,209,486 B1 * | 4/2001 | Reynolds | 119/28.5 |
| 6,286,456 B1 | 9/2001 | Michaelis | |
| 6,295,669 B1 | 10/2001 | Saus | |
| 6,338,314 B1 * | 1/2002 | Widrich | 119/28.5 |
| 6,345,400 B2 | 2/2002 | Elliott et al. | |
| 6,413,004 B1 | 7/2002 | Lin | |
| 6,415,464 B1 | 7/2002 | Hsieh | |
| 6,435,133 B1 | 8/2002 | Wayne, Jr. | |
| 6,511,562 B1 | 1/2003 | Coffield | |
| 6,513,178 B1 * | 2/2003 | Kelly et al. | 5/110 |
| 6,564,400 B2 | 5/2003 | Kelly et al. | |
| 6,591,778 B1 | 7/2003 | Alderman | |
| 6,618,879 B1 | 9/2003 | Wu | |
| 6,701,548 B2 * | 3/2004 | Vigneron | 5/110 |
| 6,729,263 B2 | 5/2004 | Miale et al. | |
| 6,857,145 B1 | 2/2005 | Sikes | |
| 6,862,757 B2 | 3/2005 | Andriunas et al. | |
| 6,938,288 B2 * | 9/2005 | Hunter et al. | 5/114 |
| 7,043,785 B2 | 5/2006 | Dimentmen | |
| 7,082,734 B2 | 8/2006 | Rowan | |
| 7,086,100 B1 * | 8/2006 | Lo | 5/110 |
| 7,207,077 B2 | 4/2007 | Hicks | |
| 7,237,506 B2 | 7/2007 | Dietz | |
| 7,266,932 B2 | 9/2007 | Rowan | |
| 7,313,835 B1 | 1/2008 | Hodges | |
| 7,540,259 B2 | 6/2009 | Pape et al. | |
| 1,820,284 A1 | 7/2009 | Mills | |
| 7,607,182 B1 * | 10/2009 | Weiner | 5/418 |
| 7,681,524 B1 * | 3/2010 | Hudson | 119/28.5 |
| 7,712,163 B2 | 5/2010 | Flannery | |
| 7,752,688 B2 | 7/2010 | Chen et al. | |
| 7,856,683 B2 * | 12/2010 | Zheng | 5/111 |
| 7,926,447 B2 | 4/2011 | Flannery | |
| 8,065,760 B2 * | 11/2011 | Brune | 5/111 |
| 8,296,879 B2 * | 10/2012 | Lin | 5/111 |
| 8,356,369 B2 * | 1/2013 | Bonatz | 5/114 |
| 2002/0096119 A1 | 7/2002 | Kolozsvari | |
| 2004/0025795 A1 | 2/2004 | Miale et al. | |
| 2004/0134433 A1 | 7/2004 | Holder | |
| 2005/0051106 A1 | 3/2005 | Tulgren et al. | |
| 2006/0042548 A1 | 3/2006 | Tharalson et al. | |
| 2007/0062456 A1 | 3/2007 | Pace | |
| 2007/0095292 A1 | 5/2007 | Musselman | |
| 2007/0151026 A1 | 7/2007 | Felix | |
| 2008/0276872 A1 | 11/2008 | Chern | |
| 2008/0282987 A1 | 11/2008 | Ritchey | |
| 2009/0090302 A1 | 4/2009 | Conrad et al. | |
| 2010/0018466 A1 | 1/2010 | Austin | |
| 2010/0154118 A1 | 6/2010 | Pearce | |
| 2010/0319123 A1 | 12/2010 | Bonatz | |
| 2011/0155069 A1 | 6/2011 | Edmonds | |

* cited by examiner

ANIMAL BED

BACKGROUND OF THE INVENTION

1. Technical Field

The present invention relates in general to beds for animals, and in particular, to animal beds suspended from a frame.

2. Description of the Related Art

Animal beds are commonly utilized to provide a pet, such as a dog or cat, a comfortable and familiar location to rest. One well known type of animal bed employs a cushion resting on a hard surface, such as a floor or basket. A second type of animal bed employs a frame elevated above the ground or floor. Animal beds with elevated frames typically include a fabric sheet that is suspended from the frame and that the animal rests upon.

SUMMARY OF THE INVENTION

In some embodiments, an animal bed includes a plurality of elongate frame members, a plurality of corner fittings coupling the plurality of elongate frame members to form a frame, a bedding supported by the frame, and at least one support supporting the frame above an underlying substrate. Each of at least first and second corner fittings among the plurality of corner fittings has a passage formed therethrough that receives therein a corresponding one of the elongate frame members.

DETAILED DESCRIPTION OF ILLUSTRATIVE EMBODIMENT

An elevated animal bed is provided that can be readily assembled and disassembled, for example, to facilitate storage or cleaning of the animal bed.

Figure 1:
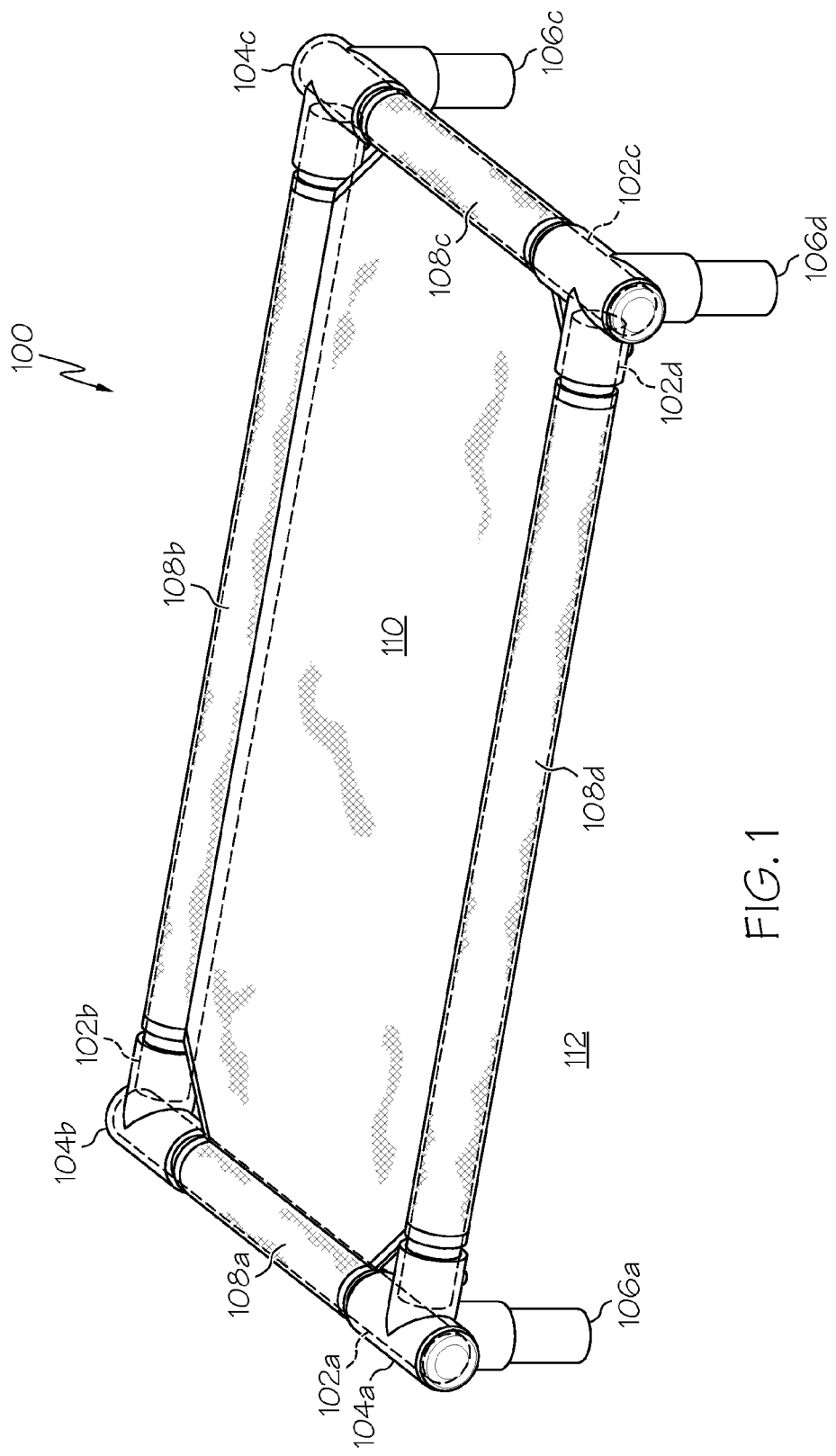
FIG. 1 is a perspective view of an exemplary embodiment of a fully assembled animal bed.

With reference now to the figures and with particular reference to FIG. 1, there is illustrated a perspective view of an exemplary embodiment of a fully assembled animal bed 100, which can be used by a dog, cat or other animal. Animal bed 100 includes frame including a plurality of elongate frame members 102a-102d and a plurality of corner fittings 104a-104d. Each of frame members 102a-102d may be formed, for example, of round, square, rectangular (or other shape) metal (e.g., steel or aluminum) tubing. Given the overall rectangular shape of the illustrated embodiment of animal bed 100, frame includes four frame members 102, including two longer frame members 102a, 102c of equal length and two shorter frame members 102b, 102d of equal length. In other embodiments, the frame may have other polygonal shapes, such as triangular, square, pentagonal, hexagonal, octagonal, etc., and may accordingly have a greater or fewer number of frame members 102 and corner fittings 104.

In a preferred embodiment, each of corner fittings 104a-104d is a three-way fitting that couples two frame members 102 and a support, such as a respective one of support legs 106a-106d that elevates the frame above an underlying substrate 112, such as the ground or floor. Like frame members 102, support legs 106 can be formed, for example, of metal tubing. In alternative embodiments, the support for the frame can take other forms, such as two or more generally U-shaped tubes coupled between pairs of corner fittings 104.

The frame of animal bed 100 elevates bedding 110 above the underlying substrate 112. Although bedding 110 can comprise a cushioned rigid member, bedding 110 preferably comprises a flexible fabric sheet having pockets 108a-108d formed therein that each receives a respective one of the plurality of frame members 102a-102d. In this preferred embodiment, bedding 110 can be a fabric, such as, ballistic nylon, polyester, acrylic, vinyl, microfiber, canvas, cotton or other suitable fabric, which may be additionally treated to enhance its stain and/or water repellency. Bedding 110 is preferably sized to so that, in use, bedding 110 remains relatively taut and adequately supports a resting animal.

In some embodiments of animal bed 100, corner fittings 104a-104d can all share a common configuration. For example, referring to FIG. 2 (which illustrates corner fitting 104a from below with support leg 106a removed) and taking corner fitting 104a as exemplary, each corner fitting 104 may include a first socket 200a for receiving a support (e.g., support leg 106a), a second socket 200b for receiving an end of one frame member 102 (e.g., frame member 102d), and a housing 202 defining a passage 204 in the corner fitting 104 sized to receive therethrough another frame member 102 (e.g., frame member 102a). In such embodiments, the frame member 102 received into second socket 200b is preferably retained by second socket 200b only by interference fit (i.e., a machine screw 212 or other fastener is omitted). The frame member 102 received in passage 204 is preferably retained by a manually releasable retention mechanism that couples the frame member 102 to corner fitting 104a in a desired relation and that can be released without removal of hardware (e.g., a nut and bolt). For example, in the depicted embodiment, frame member 102a comprises a shaft formed of metal tubing that has captured therein a detent 206a (i.e., a spring-biased pin urged radially outward from a longitudinal axis of frame member 102a) that engages a corresponding registration hole 208 in housing 202. The positions of registration hole 208 along housing 202 and of detent 206a along the longitudinal axis of frame member 102a are predetermined to retain a fabric bedding 110 at sufficient tension to comfortably support an animal. As an assembly aid, housing 202 may optionally further include a recess 210 along at least a portion of passage 204 that facilitates the traversal of passage 204 by detent 206a.

Figure 2:
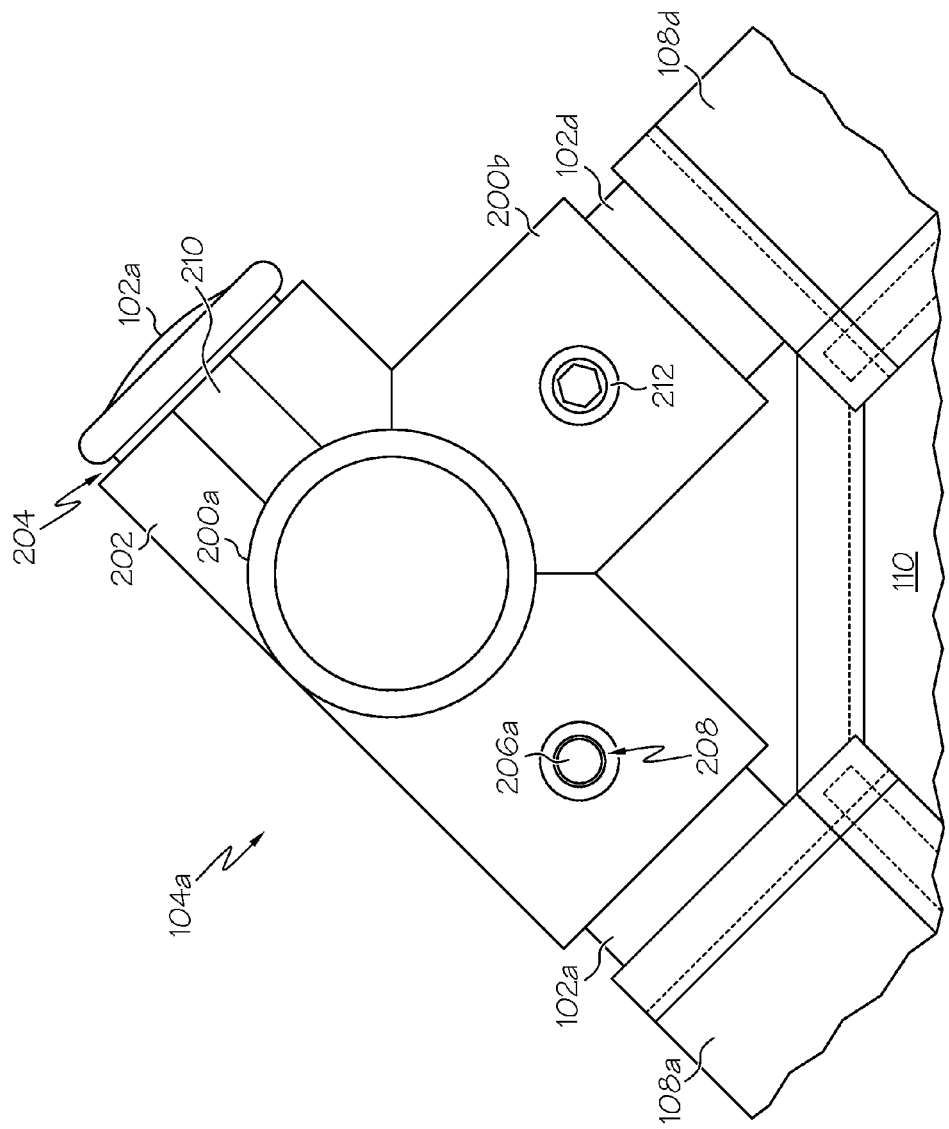
FIGS. 2-5 respectively illustrate first through fourth corner fittings of the exemplary embodiment of an animal bed shown in FIG. 1.
Figure 3:
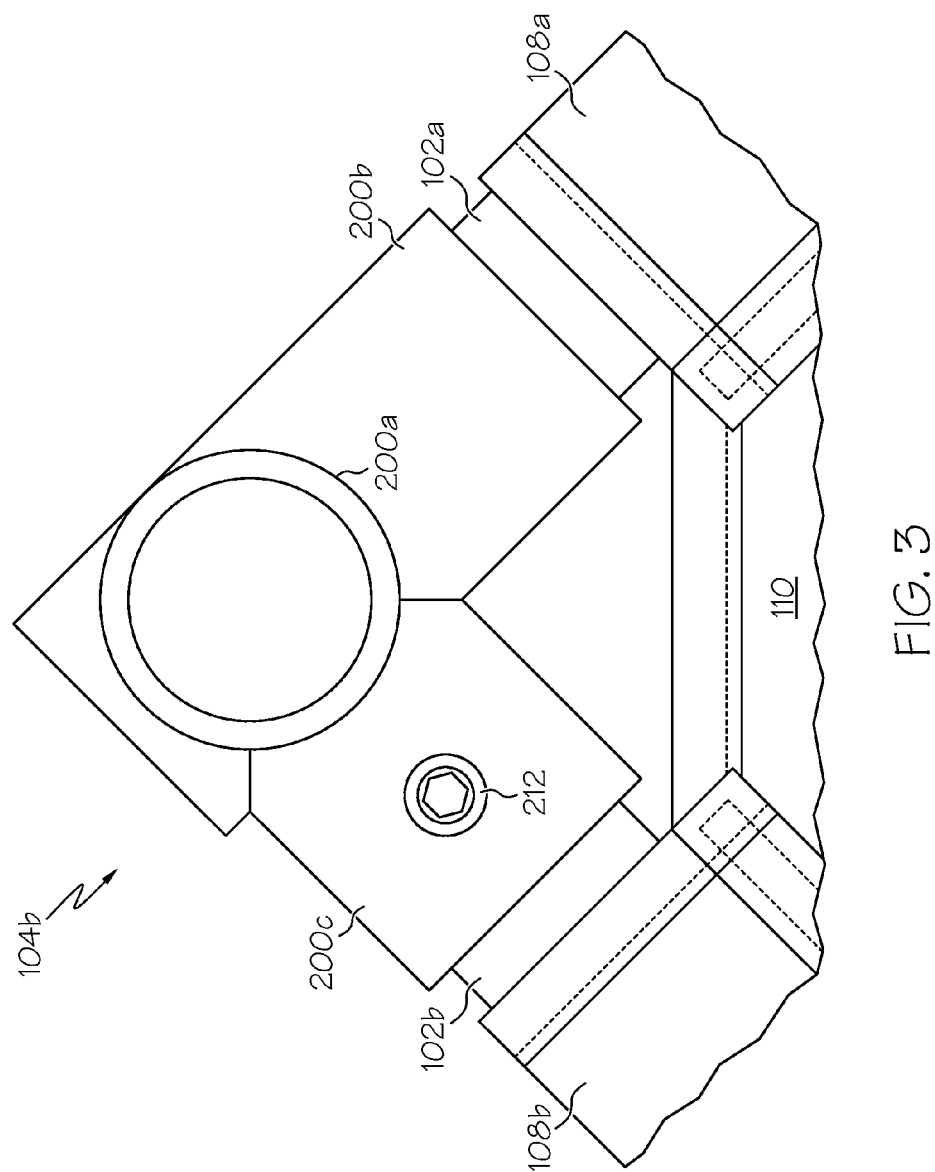
Figure 4:
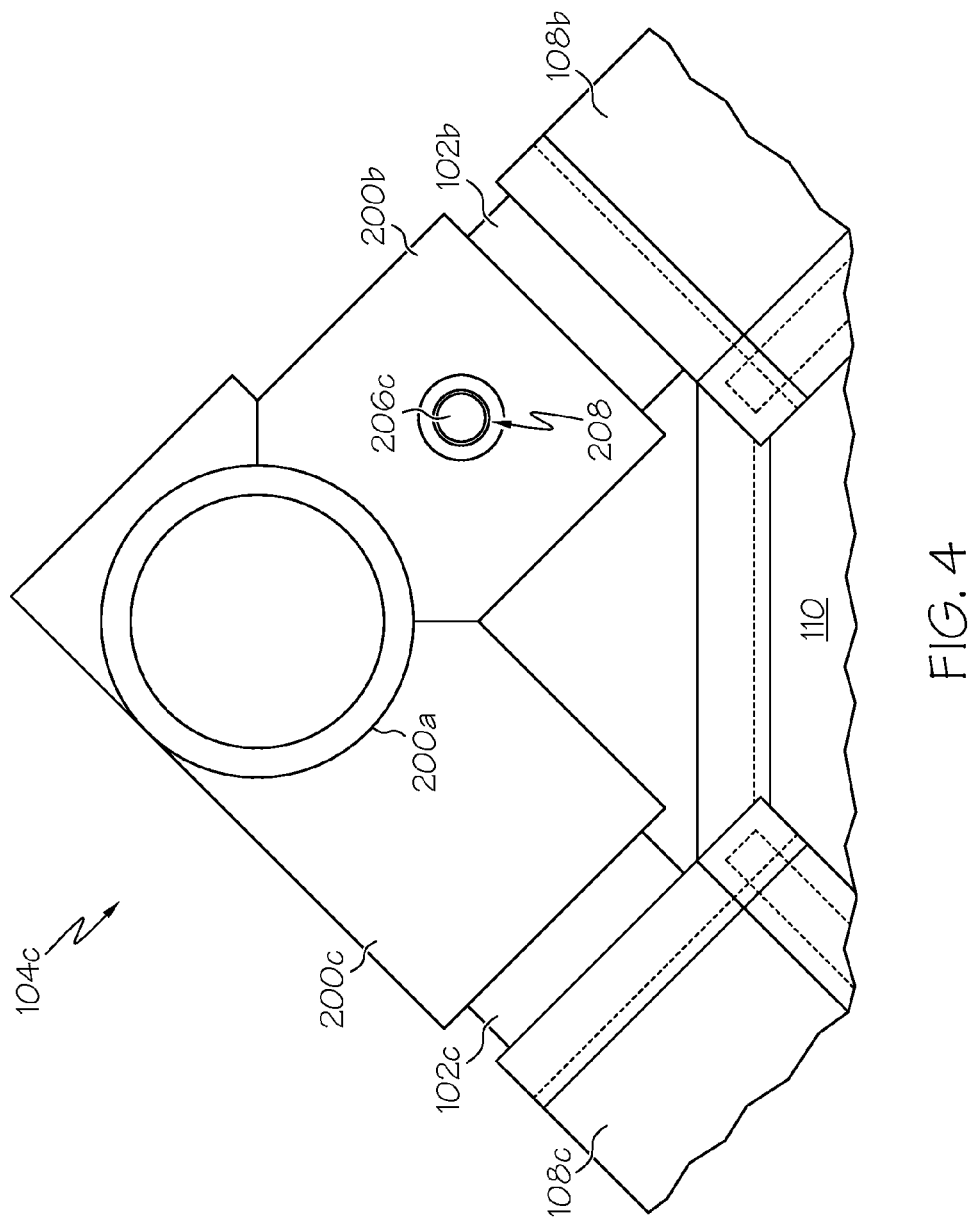
Figure 5:
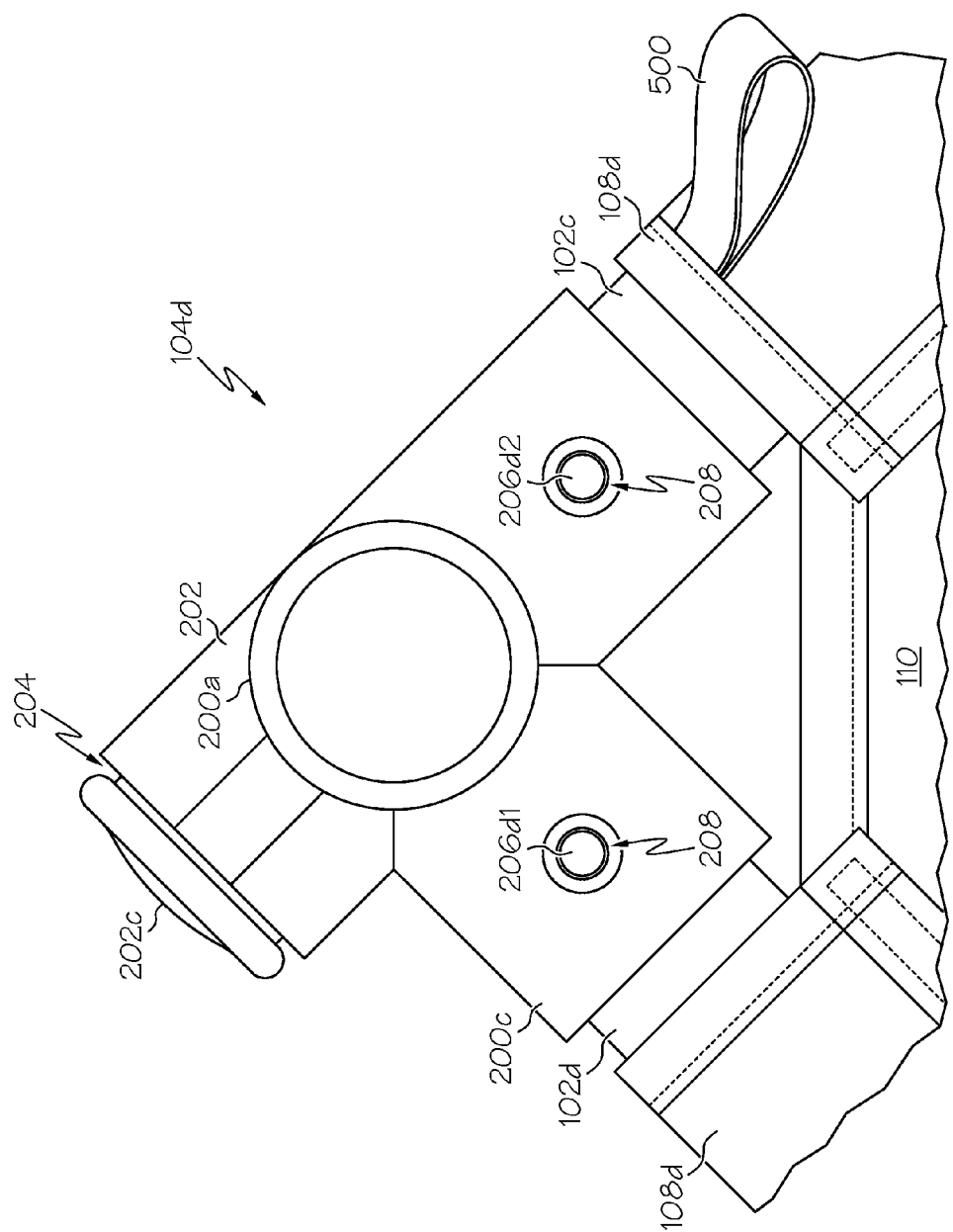

In alternative embodiments of animal bed 100, one or more of corner fittings 104a-104d may have differing configurations with respect to the manner in which the corner fittings 104 couple to frame members 102. For example, in the embodiment shown in FIG. 1, each of corner fittings 104a-104d has a different configuration. Specifically, as best seen in FIG. 2, corner fitting 104a is permanently or semi-permanently connected to frame member 102d by a machine screw 212 and is releasably coupled to frame member 102a by the engagement of detent 206a of frame member 102a with registration hole 208 of corner fitting 104a. Further, as shown in FIG. 3 (which illustrates corner fitting 104b from below with support leg 106b removed from first socket 200a), corner fitting 104b receives, and retains only by interference fit, frame member 102a in second socket 200b and is permanently or semi-permanently connected by a machine screw 212 to a frame member 102b retained in a third socket 200c. Further, as shown in FIG. 4 (which depicts corner fitting 104c from below with support leg 106c removed from first socket 200a), corner fitting 104c receives, and retains only by interference fit, frame member 102c in third socket 200c and is releasably coupled to frame member 102b by the engagement of detent 206c of frame member 102b with registration hole 208 of corner fitting 104c. Finally, as shown in FIG. 5 (which depicts corner fitting 104d from below with support leg 106d removed from first socket 200a), corner fitting 104d receives frame member 102c in a passage 204 through its housing 202 and is releasably coupled to frame member 102c by the engagement of detent 206d2 of frame member 102c with registration hole 208 of corner fitting 104d. Corner fitting 104d further receives frame member 102d in socket 200c and is releasably coupled to frame member 102c by the engagement of detent 206d1 of frame member 102d with registration hole 208 of corner fitting 104d.

Employing corner fittings 104a-104d having differing configurations as shown facilitates enables application of the proper tension to a fabric bedding 110 to prevent undesired sagging. Further, use of corner fittings 104a-104d of differing configurations as shown makes animal bed 100 easier to assemble and can additionally reduce the total number of pieces when animal bed 100 is disassembled. Assembly of animal bed 100 is also facilitated by the provision of one or more attachment loops 500 attached adjacent one or more edges of fabric bedding 100, for example, on one or more of pockets 108a-108d as depicted in FIG. 5.

Figure 6:
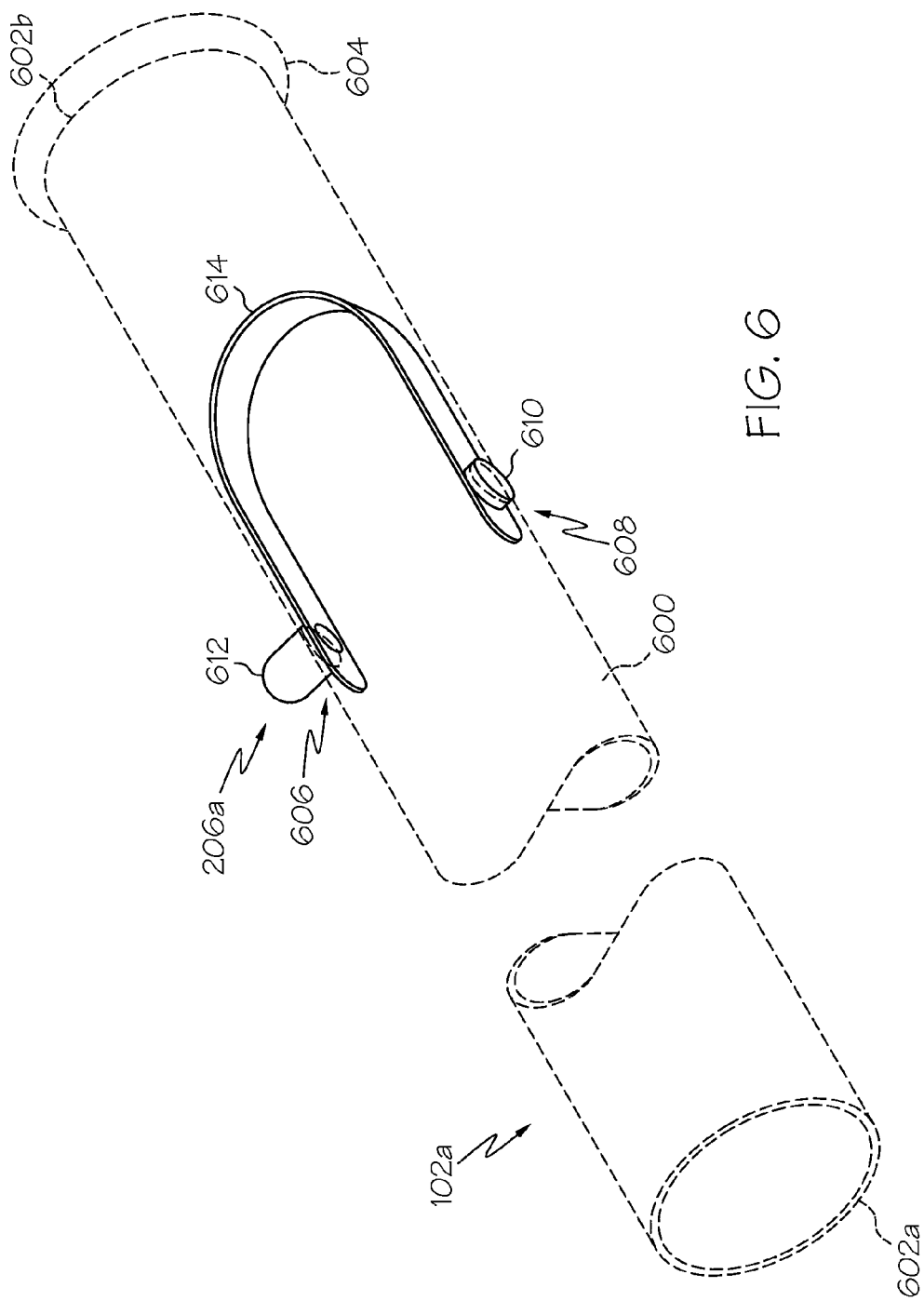
FIG. 6 depicts a frame member having a detent in accordance with an exemplary embodiment.

Referring now to FIG. 6, there is depicted a frame member 102a in accordance with one exemplary embodiment. In the depicted embodiment, frame member 102a is formed of an elongate metal tube 600 that has a circular cross section and that extends between a first end 602a and a second end 602b. Second end 602b, which is disposed within housing 202 of corner fitting 102a when animal bed 100 is assembled, is optionally but preferably closed by a decorative cap 604. As further shown in FIG. 6, tube 600 has a pair of aligned holes 606, 608 formed therethrough orthogonal to its central longitudinal axis. Holes 606 and 608 are displaced from second end 602b at a location selected to correspond to registration hole 208 in corner fitting 102a. Captured within holes 606, 608 is a detent 206a having a boss 610 and a pin 612 biased apart by leaf spring 614. Capturing boss 610 in hole 608 prevents detent 206a from being displaced (and possibly falling within metal tube 600) as pin 612 is manually depressed, for example, to insert frame member 102a through passage 202 of corner fitting 102a or to release detent 206a from engagement with registration hole 208 of corner fitting 102a.

Figure 7:
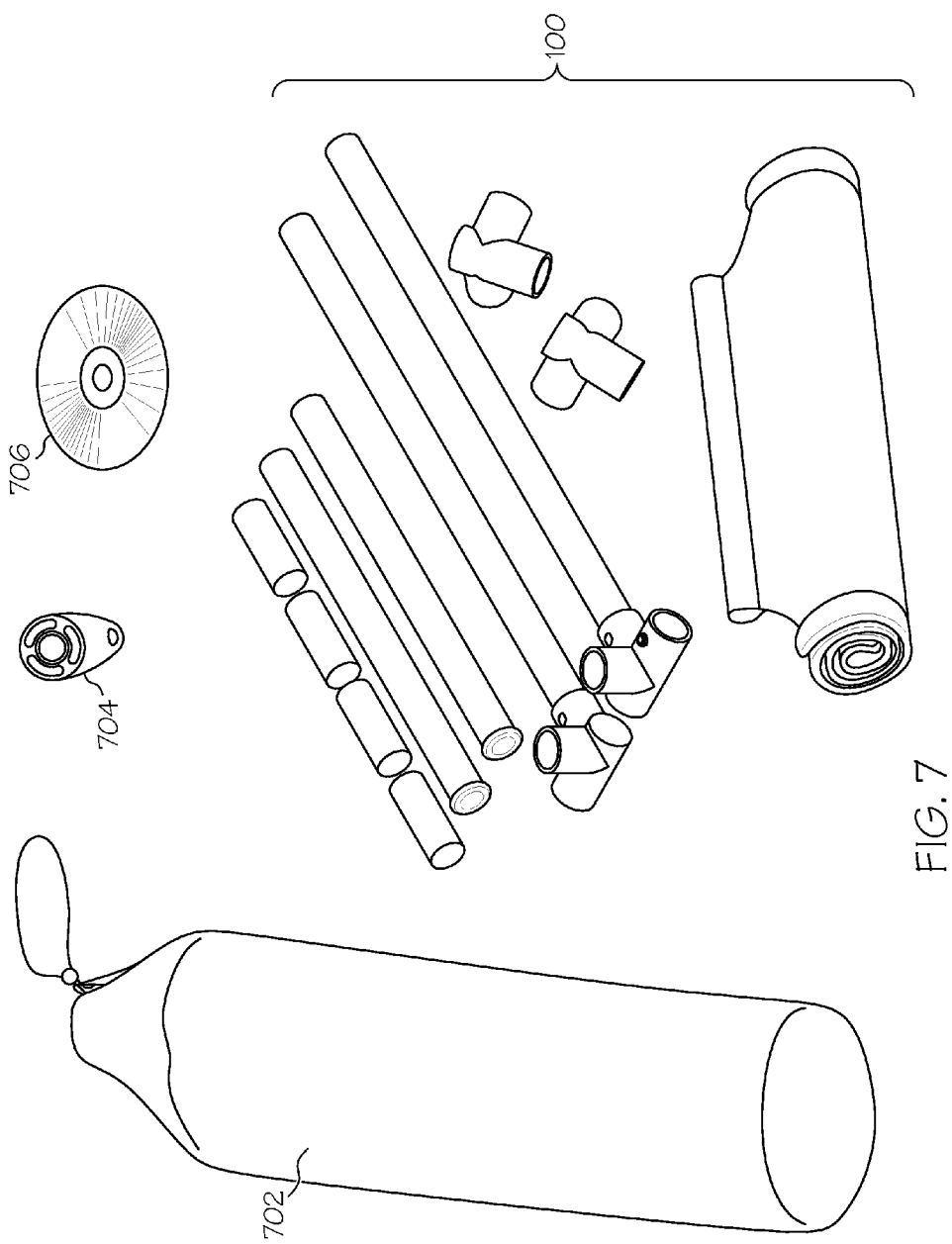
FIG. 7 illustrates an exemplary embodiment of an animal bed kit.

With reference now to FIG. 7, there is illustrated an exemplary embodiment of an animal bed kit 700. In the illustrated embodiment, animal bed kit 700 includes a sack 702 (e.g., of ballistic nylon) containing an animal bed 100 as previously described in its disassembled form, an audible feedback training device (e.g., a clicker) 704, and an animal training guide recorded on a storage medium 706 (e.g., a DVD or CD). By employing audible feedback training device 704 in accordance with the animal training guide recorded on storage medium 706, a user can train an animal to rest on command and/or at designated times of day on assembled animal bed 100.

Figure 8:
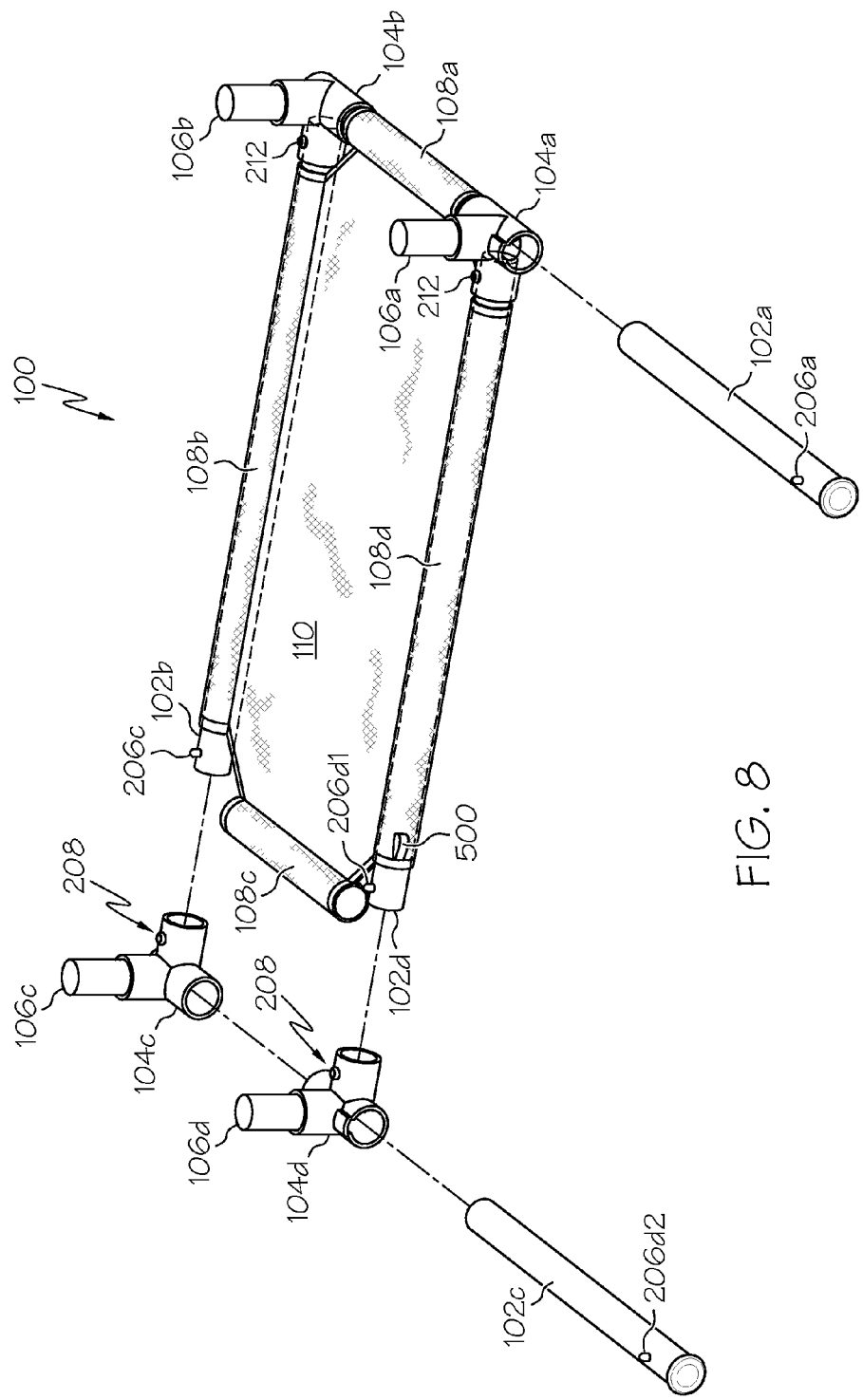
FIG. 8 illustrates in exploded form the assembly of an exemplary embodiment of an animal bed.

Referring now to FIG. 8, there is depicted in exploded form the assembly of the exemplary animal bed 100 depicted in FIG. 1. In order to assemble animal bed 100 from the disassembled state illustrated in FIG. 7, the disassembled animal bed is removed from sack 702. The fabric bedding 110 can then be laid out flat on a substrate with pockets 108a-108d facing upward. The free ends of frame members 102b and 102d (i.e., those not connected to corner fittings 104a and 104b by machine screws 212) can then be inserted through pockets 108b and 108d, respectively, with sockets 200a open upward. Corner fittings 104c and 104d can then be releasably coupled to the free ends of frame members 102b and 102d, respectively, (with their sockets 200a open upward) by the engagement of detents 206c and 206d1 of frame members 102b and 102d, respectively, with their corresponding registration holes 208 in corner fittings 104c and 104d. Frame members 102a and 102c can then be inserted through the passages 202 in corner fittings 104a and 104d, respectively, and removably coupled to corner fittings 104b and 104c, respectively, by the engagement of detents 206a and 206d2 of frame members 102a and 102c, respectively, with the corresponding registration holes 208 in corner fittings 104b and 104c. The releasable coupling of frame members 102a and 102c to corner fittings 104b and 104c serves to appropriately tension fabric bedding 110. Support legs 106a-106d can be inserted into sockets 200a of corner fittings 104a-104d to complete the assembly of animal bed 100. The assembled animal bed 100 can then be placed in a desired location with support legs 106 supporting the frame above the underlying substrate 112, as shown in FIG. 1.

Although a particular order of assembly has been described with reference to FIG. 8, it should be appreciated that other orders of assembly may alternatively by employed. Further, in other embodiments of animal bed 100, the method of assembly will differ accordingly.

As has been described, in some embodiments, an animal bed includes a plurality of elongate frame members, a plurality of corner fittings coupling the plurality of elongate frame members to form a frame, bedding, such as a fabric sheet, supported by the frame, and at least one support supporting the frame above an underlying substrate. Each of at least first and second corner fittings among the plurality of corner fittings has a passage formed therethrough that receives therein a corresponding one of the elongate frame members.

In some embodiments, multiple elongate frame members have retained therein at least one manually releasable retention mechanism, such as a detent, that couples the elongate frame member to one of the plurality of corner fittings.

In some embodiments, the plurality of corner fittings share a common configuration. In other embodiments, the plurality of corner fittings have differing configurations with respect to the manner in which the corner fittings couple the frame members.

In some embodiments, the animal bed may further form a part of an animal training kit including at least the animal bed, an audible feedback training device and a package for the animal bed and the audible feedback training device. The animal training kit may further include an animal training guide, which may be stored on a data storage medium, such as a DVD or CD.

While the present invention has been particularly shown as described with reference to one or more preferred embodiments, it will be understood by those skilled in the art that various changes in form and detail may be made therein without departing from the spirit and scope of the invention.

What is claimed is:

1. An animal bed, comprising:
    a plurality of elongate frame members;
    a plurality of corner fittings configured to couple the plurality of elongate frame members to form a frame, wherein each of at least first and second corner fittings among the plurality of corner fittings has a passage formed therethrough configured to receive therein a corresponding one of the elongate frame members, wherein at least three of the plurality of corner fittings have differing configurations and wherein each of multiple elongate frame members among the plurality of elongate frame members has retained therein at least one manually releasable retention mechanism that couples the elongate frame member to one of the plurality of corner fittings;
bedding configured to be supported by the frame; and
at least one support configured to support the frame above an underlying substrate.

2. The animal bed of claim 1, wherein each of the at least one manually releasable retention mechanism comprises a detent configured to engage a corresponding recess in one of the plurality of corner fittings.

3. The animal bed of claim 2, wherein:
the detent comprises a spring-biased pin; and
each of the multiple elongate frame members has formed therein a registration hole configured to retain a corresponding spring-biased pin.

4. The animal bed of claim 1, wherein:
each of the plurality of corner fittings comprises a three-way fitting;
the plurality of corner fittings further includes third and fourth corner fittings;
the first corner fitting includes a socket configured to receive an end of one of the plurality of elongate frame members, wherein each of the passage of the first corner fitting and the socket of the first corner fitting has a respective recess configured to engage a detent;
the second corner fitting includes a socket configured to receive an end of one of the plurality of elongate frame members, wherein the passage of the second corner fitting has a recess configured to engage a detent;
the third corner fitting includes two sockets configured to receive ends of two of the plurality of elongate frame members, wherein only one of the sockets has a recess configured to engage a detent; and
the fourth corner fitting includes two sockets configured to receive ends of two of the plurality of elongate frame members.

5. The animal bed of claim 1, wherein the bedding comprises a flexible fabric sheet having pockets formed therein configured to receive the plurality of elongate frame members.

6. The animal bed of claim 5, wherein the flexible fabric sheet has attached thereto at least one assembly loop adjacent an edge of the flexible fabric sheet.

7. The animal bed of claim 1, each of the plurality of corner fittings comprises a three-way fitting.

8. The animal bed of claim 1, wherein the at least one support comprises a plurality of supporting legs each configured to be connected to a respective one of the plurality of corner fittings.

9. The animal bed of claim 1, wherein the plurality of elongate frame members comprises a plurality of metal tubular members.

10. The animal bed of claim 9, wherein:
the plurality of metal tubular members comprises four metal tubular members; and
the plurality of corner fittings comprises four corner fittings.

11. The animal bed of claim 1, wherein the frame is rectangular.

12. The animal bed of claim 1, and further comprising:
an audible feedback training device; and
a package for the audible feedback training device, the plurality of elongate members, the plurality of corner fittings, the at least one support, and the bedding.

13. An animal bed, comprising:
a plurality of elongate frame members;
a plurality of corner fittings configured to couple the plurality of elongate frame members to form a frame, wherein each of at least first and second corner fittings among the plurality of corner fittings has a passage formed therethrough configured to removably and slidably receive therethrough a corresponding one of the elongate frame members, and wherein at least three of the plurality of corner fittings have differing configurations;
bedding configured to be supported by the frame;
at least one support configured to support the frame above an underlying substrate;
a first manually releasable retention mechanism configured to releasably retain a corresponding one of the elongate frame members disposed through an entire extent of the passage formed through the first corner fitting; and
a second manually releasable retention mechanism configured to releasably retain a corresponding one of the elongate frame members disposed through an entire extent of the passage formed through the second corner fitting.

14. The animal bed of claim 13, wherein each of the first and second manually releasable retention mechanisms comprises a detent configured to engage a corresponding recess in a one of the first and second corner fittings.

15. The animal bed of claim 14, wherein:
the detent comprises a spring-biased pin; and
at least two of the multiple elongate frame members have formed therein a registration hole configured to retain a corresponding spring-biased pin.

16. The animal bed of claim 13, and further comprising:
an audible feedback training device; and
a package for the audible feedback training device, the plurality of elongate members, the plurality of corner fittings, the at least one support, and the bedding.

17. The animal bed of claim 13, wherein each of the plurality of corner fittings comprises a three-way fitting.

18. The animal bed of claim 13, wherein:
the first corner fitting includes a socket configured to receive an end of one of the plurality of elongate frame members, wherein the passage of the first corner fitting has a recess configured to engage the first manually releasable retention mechanism;
the second corner fitting includes a socket configured to receive an end of one of the plurality of elongate frame members, wherein the passage of the second corner fitting has a recess configured to engage the second manually releasable retention mechanism; and
the plurality of corner fittings further includes third and fourth corner fittings each including two sockets configured to receive ends of two of the plurality of elongate frame members.

19. The animal bed of claim 13, wherein the bedding comprises a flexible fabric sheet having pockets formed therein configured to receive the plurality of elongate frame members.

20. The animal bed of claim 19, wherein the flexible fabric sheet has attached thereto at least one assembly loop adjacent an edge of the flexible fabric sheet.

21. The animal bed of claim 13, wherein the at least one support comprises a plurality of supporting legs each configured to be connected to a respective one of the plurality of corner fittings.

22. The animal bed of claim 13, wherein the plurality of elongate frame members comprises a plurality of metal tubular members.

23. The animal bed of claim 22, wherein:
the plurality of metal tubular members comprises four metal tubular members; and
the plurality of corner fittings comprises four corner fittings.

24. The animal bed of claim 13, wherein the frame is rectangular.

* * * * *